United States Patent Office 3,470,440
Patented Sept. 30, 1969

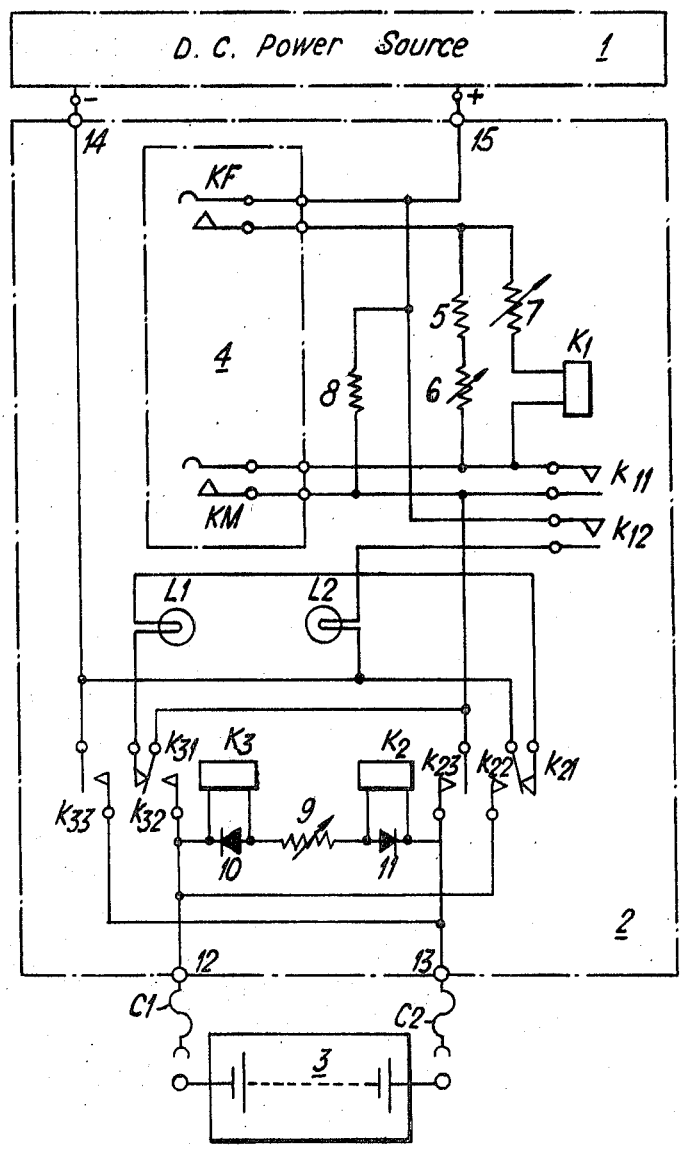

3,470,440
STORAGE BATTERY CHARGING EQUIPMENT
Michael Rheingold, Thalwil, and Jean R. E. Debrunner, Langnau am Albis, Switzerland, assignors to International Standard Electric Corporation, New York, N.Y., a corporation of Delaware
Filed Mar. 13, 1967, Ser. No. 622,534
Claims priority, application Switzerland, Mar. 18, 1966, 3,989/66
Int. Cl. H02j 7/00; H01m 45/04
U.S. Cl. 320—25
1 Claim

ABSTRACT OF THE DISCLOSURE

A connected battery to be charged by self-service equipment is automatically related to the charging source in correct polarity by a pair of polarized relays. Automatic control of the charging voltage and charging time accommodates both the 6 and 12 voltage batteries without external settings being required and provides the same number of watt-hours per coin unit irrespective of the voltage of the battery.

---

The present invention relates to a charging equipment for storage batteries, and particularly to charging equipment adapted for coin controlled self-service usage.

BACKGROUND OF THE INVENTION

Known charging equipment could be equipped with a prepayment meter for self-service usage, but conventional charging equipment requires a self-service customer with technical knowledge. For example, the customer would need to know the nominal voltage of the battery to be charged and particularly would need to understand polarities in order that the charging equipment is connected to the battery with the correct polarity.

It is therefore an object of the present invention to provide charging equipment which is adapted for self-service, that is the equipment must automatically adapt the charger to provide the correct voltage and polarity.

SUMMARY OF THE INVENTION

Briefly, the invention provides charging equipment including means for testing the polarity of the connected battery, means for adapting the charging equipment to charge the battery with the correct polarity, irrespectively of the manner in which the battery is connected to the charging equipment, means for controlling the charging current to safely charge batteries with different numbers of cells without the need for external customer-operated controls, and means for controlling the charging equipment to supply the same number of watt-hours per coin unit for all batteries irrespective of their nominal voltage.

BRIEF DESCRIPTION OF THE DRAWINGS

The invention will be best understood from the following description of an embodiment of the invention taken in conjunction with the accompanying drawing which shows the battery to be charged and the charging equipment in block diagram form and the associated control equipment in circuit diagram form.

DESCRIPTION OF THE PREFERRED EMBODIMENT

The equipment comprises conventional battery charging equipment 1 arranged to supply a direct current voltage of 18 volts, a coin-operated control device 2, and a 6 or 12 volt battery 3 to be charged.

The control device 2 includes a run-down type clock 4 with a maximum setting time of 8 hours which is selectable by the number of coins inserted. Clock 4 is provided with flag contacts KF and coin-pulse contacts KM. The flag contacts KF are closed upon insertion of a coin and remain closed until the time corresponding to the number of coins deposited is expired. The coin-pulse contacts KM momentarily close during each insertion of a coin.

The control device 2 includes a "standby" indicator lamp L1 and a "charge" indicator lamp L2. The lamp L1 when lighted indicates the charging device is operating and ready for use if no battery is connected or that the charging period has expired if a battery is still connected to the equipment. The lamp L2, when lighted, indicates that charging current is flowing and that a connected battery is being charged.

A pair of polarity detection relays K2 and K3 are connected in series between battery cable terminals 12 and 13. Relays K2 and K3 are oppositely polarized by oppositely poled unidirectional diodes 11 and 10 being connected in parallel with the winding of relays K2 and K3 respectively. When the negative pole of battery 3 is connected to terminal 12, relay K2 will operate and when the negative pole is connected to terminal 13, relay K3 will operate. Contacts on these relays switch the output of the charger 1 to correspond to the particular battery connected effected. A thermal responsive device 9 whose resistance increases as the current flow therethrough increases is connected in series with the two relays K2 and K3 to prevent wide ranges of current flow through the windings of relays K2 and K3.

Charge control relay K1 is operated when a coin is deposited and remains operated as long as the clock 4 indicates unexpired time thereon or until the battery connection to the cable terminals is broken. Contacts on relay K1 control the "charge" indicator as previously described.

The operation of the battery charging system will now be explained in detail.

In the standby condition when terminals 12 or 13 are unconnected, charging current from charger 1 flows from terminal 15 through resistor 8, through break contacts K32, the "standby" lamp L1 and through break contacts K21 to terminal 14. Lamp L1 is lighted, indicating the equipment is ready for use.

When a customer desires to charge a battery 3, the charging equipment is connected to the battery by unmarked cables such as C1 and C2.

If the negative pole of battery 3 is the one connected to cable C1, battery current flows through diode 10 which is poled to present a low resistance to such current flow; through current limiting resistor 9 and by the blocking action of diode 11 through the winding of relay K2 to the anode or positive pole of battery 3. Relay K2 operates and its break contacts K21 open the circuit of indicator lamp L1; its make contacts K22 connect the negative pole of battery 3 directly to the negative terminal 14 of charger 1; and make contacts K23 connect the positive pole of battery 3 to the positive terminal 13 of charger 1 through resistor 8. Resistor 8 is of high resistance and only negligible charging current flows therethrough to battery 3. The equipment is now readied to receive coins to begin the charging period.

If the positive pole of battery 3 is connected to cable C1, relay K3 would operate since diode 10 is in a blocking condition causing current to flow through the winding of relay K3. Break contacts K32 of relay K3 would open the circuit of lamp L1; make contacts K33 would connect the negative pole of battery 3 directly from cable C2 and terminal 13 to the negative terminal 14 of charger 1; and contacts K34 would connect the positive pole of battery 3 to the positive terminal 15 of charger 1 through the noted high resistance resistor 8.

When a proper coin is inserted and the clock mechanism actuated in the normal manner, flag contacts KF are closed and remain closed until the clock mechanism is returned to normal after expiration of the time corresponding to the coins inserted. When the clock mechanism is actuated after each insertion of a coin, the coin contacts KM are momentarily closed. The concurrent closure of contacts KF and KM control the charging equipment as follows:

Current flows from the negative terminal 14 of charger 1 through make contacts K33 or K22 to the negative pole of battery 3, from the positive pole of battery 3, through make contacts K31 or K23, through closed coin contacts KM, through the winding of relay K1 and resistor 7 in parallel with resistors 5 and 6 and through closed flag contacts KF to the positive terminal 15 of charger 1.

Relay K1 operates and locks operated through its make contacts K11 independently of coin contacts KM. The charging current also flows through the operated contacts K11. Contacts K12 of relay K1 energize "charge" lamp L2 by connecting it directly between the output terminals of charger 1.

At this time resistance 8 is in parallel with resistors 5 and 6 which are also in parallel with resistor 7 and the winding of relay K1, the resulting total resistance of this network being small to provide a substantial charging current to flow.

In order to maintain the current flow at a proper level throughout the charging period resistance 5 is a thermal responsive device whose resistance increases as the current increases thereby maintaining a relatively constant charging current. With such an arrangement, the power supplied per coin unit remains substantially constant irrespective of the voltage of the battery.

If the customer removes the cables C1 and C2 before the charging time has expired, their removal opens the circuit for relay K1 permitting it to release to open the charging path at contacts K11. The operated one of the relays K2 or K3 releases and returns the equipment to standby condition. Even though the flag contacts KF are still closed, a subsequent customer cannot activate the charging equipment until at least one coin is inserted to energize the coin contacts KM.

When the charging time has expired, contacts KF are opened by the clock mechanism and thus open the holding circuit of relay K1 permitting it to restore. The restoration of relay K1 returns the equipment to standby position as above described.

Although as described above, the means for testing the polarity of a connected battery includes a pair of relays shunted by diodes oppositely arranged, other configurations and devices are possible alternatives. For example, polarized relays can be substituted for the relays K2 and K3 so that with one battery connection one of the relays will be energized effecting correct polarity connection, and with an opposite battery connection the other relay is energized again providing correct charging current polarity. A still further alternate scheme would be to use a single magnetic polarized relay having a neutral mid-position, such that a first battery connection would actuate the relay to a first position providing appropriate polarity connection with the charging current, and with another polarity arrangement of the battery, different actuation of the relay would result in a different but correct charging current connection.

The equipment is especially qualified for use at parking places where vehicles stay for several hours, e.g. on parking places of firms, camps or winter sporting places.

While we have illustrated and described the preferred form of construction for carrying our invention into effect, this is capable of variation and modification without departing from the spirit of the invention. We therefore do not wish to be limited to the precise details of construction set forth, but desire to avail ourselves of such variations and modifications as come within the scope of the appended claim.

What is claimed is:

1. Storage battery charging equipment comprising:
charging means having a fixed polarity;
control equipment connected to said charging means and having means for connecting said charging means to a battery to be charged;
polarity detection means in said control equipment for detecting the polarity connection of the battery to the control equipment;
switching means in said control equipment controlled by the detection means for connecting the battery to the charging means in proper polarity relationship;
timing means in said control equipment for supplying charging current to the connected battery for a variable time period determined by the setting of said timing means; and
current controlling means in said control equipment for automatically varying the magnitude of the current flow according to the nominal voltage of the battery being charged, said polarity detection means including a pair of opposite poled electromagnetic devices, each operable in response to a predetermined voltage polarity, said polarity detection means including a thermal responsive device whose resistance increases with an increase in current flow therethrough, said thermal responsive device being connected in series with said electromagnetic device to maintain substantially constant current flow through said electromagnetic device irrespective of the nominal voltage of the connected battery.

References Cited

UNITED STATES PATENTS

| | | | |
|---|---|---|---|
| 1,225,388 | 5/1917 | Woodbridge | 317—41 X |
| 1,887,599 | 11/1932 | Nyguist | 323—68 X |
| 2,369,675 | 2/1945 | Houghton | 323—68 X |
| 3,217,225 | 11/1965 | Gottlieb et al. | 320—25 X |

JOHN F. COUCH, Primary Examiner

STANLEY WEINBERG, Assistant Examiner

U.S. Cl. X.R.

317—123; 320—35